(12) United States Patent
Devitt et al.

(10) Patent No.: US 10,556,696 B2
(45) Date of Patent: Feb. 11, 2020

(54) ILLUMINATED ROPE AS AN AIRCRAFT EMERGENCY EGRESS AID

(71) Applicant: Bell Helicopter Textron Inc., Fort Worth, TX (US)

(72) Inventors: Daniel Frank Devitt, Arlington, TX (US); Michael Reaugh Smith, Colleyville, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 336 days.

(21) Appl. No.: 15/249,046

(22) Filed: Aug. 26, 2016

(65) Prior Publication Data

US 2018/0057178 A1   Mar. 1, 2018

(51) Int. Cl.
| | | |
|---|---|---|
| *B64D 25/08* | (2006.01) | |
| *B64D 47/02* | (2006.01) | |
| *F21K 2/06* | (2006.01) | |
| *F21V 8/00* | (2006.01) | |
| *F21V 9/30* | (2018.01) | |

(52) U.S. Cl.
CPC ............ *B64D 25/08* (2013.01); *B64D 47/02* (2013.01); *F21K 2/06* (2013.01); *F21V 9/30* (2018.02); *G02B 6/0008* (2013.01)

(58) Field of Classification Search
CPC ........... B64D 25/08; B64D 47/02; F21V 9/30; G02B 6/0008; F21K 2/06
See application file for complete search history.

(56) References Cited

U.S. PATENT DOCUMENTS

| | | | |
|---|---|---|---|
| 3,350,553 A | 10/1967 | Cline | |
| 5,673,988 A * | 10/1997 | Fujita | F21K 2/06 362/159 |
| 7,011,427 B1 * | 3/2006 | Baez | G08B 5/004 362/184 |
| 7,703,956 B2 | 4/2010 | Wentland et al. | |
| 2002/0126473 A1 * | 9/2002 | Conti | F21V 9/30 362/84 |
| 2005/0171408 A1 * | 8/2005 | Parker | A61B 90/35 600/249 |
| 2008/0266886 A1 * | 10/2008 | Wentland | B64D 11/00 362/470 |
| 2009/0059615 A1 * | 3/2009 | Wainright | G02B 6/0008 362/555 |
| 2015/0338063 A1 * | 11/2015 | Buckley | F21S 43/13 362/551 |
| 2017/0090088 A1 * | 3/2017 | Motoya | B63C 11/18 |

* cited by examiner

*Primary Examiner* — Brian M O'Hara
*Assistant Examiner* — Keith L Dixon

(57) ABSTRACT

In some implementations, in an emergency in the vehicle, an emergency evacuation path is illuminated using the light emitted from the emergency evacuation rope where at least a portion of the emergency evacuation path extends to a location outside the vehicle. Egress of occupants along the emergency evacuation path is enabled using an emergency evacuation rope.

20 Claims, 3 Drawing Sheets

ILLUMINATED ROPE AS AN AIRCRAFT EMERGENCY EGRESS AID

TECHNICAL FIELD

This disclosure relates to emergency egress aids, for example, aids used during an emergency evacuation from an aircraft, for example, a rotorcraft.

BACKGROUND

Aircrafts, for example, and planes, helicopters, or other aircraft, have become a common mode of transportation. Sometimes, unfortunately, an aircraft experiences emergency conditions and needs to make a controlled or uncontrolled descent. Upon landing, the aircraft may or may not be in an upright position or the exit gear of the aircraft may or may not function or both. In such situations, exit aids in the aircraft can be implemented to allow occupants to quickly and safely exit the aircraft.

SUMMARY

This specification describes technologies relating to illuminated rope as an act of emergency egress aid.

In some implementations, in an emergency in the vehicle, an emergency evacuation path is illuminated using the light emitted from the emergency evacuation rope where at least a portion of the emergency evacuation path extends to a location outside the vehicle. Egress of occupants along the emergency evacuation path is enabled using an emergency evacuation rope.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Federal Aviation Administration (FAA) regulations specify certain conditions under which an aircraft, for example, a rotorcraft or other aircraft, needs to provide exit aids for occupants to exit the aircraft. For example, when the aircraft exit threshold is more than 6 feet above the ground, the regulations require that exit aids be available for the occupants. Such a threshold can be met when a rotorcraft is in an emergency condition, for example, a roll-over condition. Under such conditions, the regulations allow a rope to be part of the certified rotorcraft installation for use as an occupant. The regulations also require that the exit aid be illuminated to be visible and specify a minimum luminosity of the exit aid. This disclosure describes an illuminated rope as an aircraft emergency egress aid. The emergency egress aid can be implemented without adding additional extra wiring or fixed wiring to the aircraft, thereby negating weight addition to the aircraft.

Figure 1:
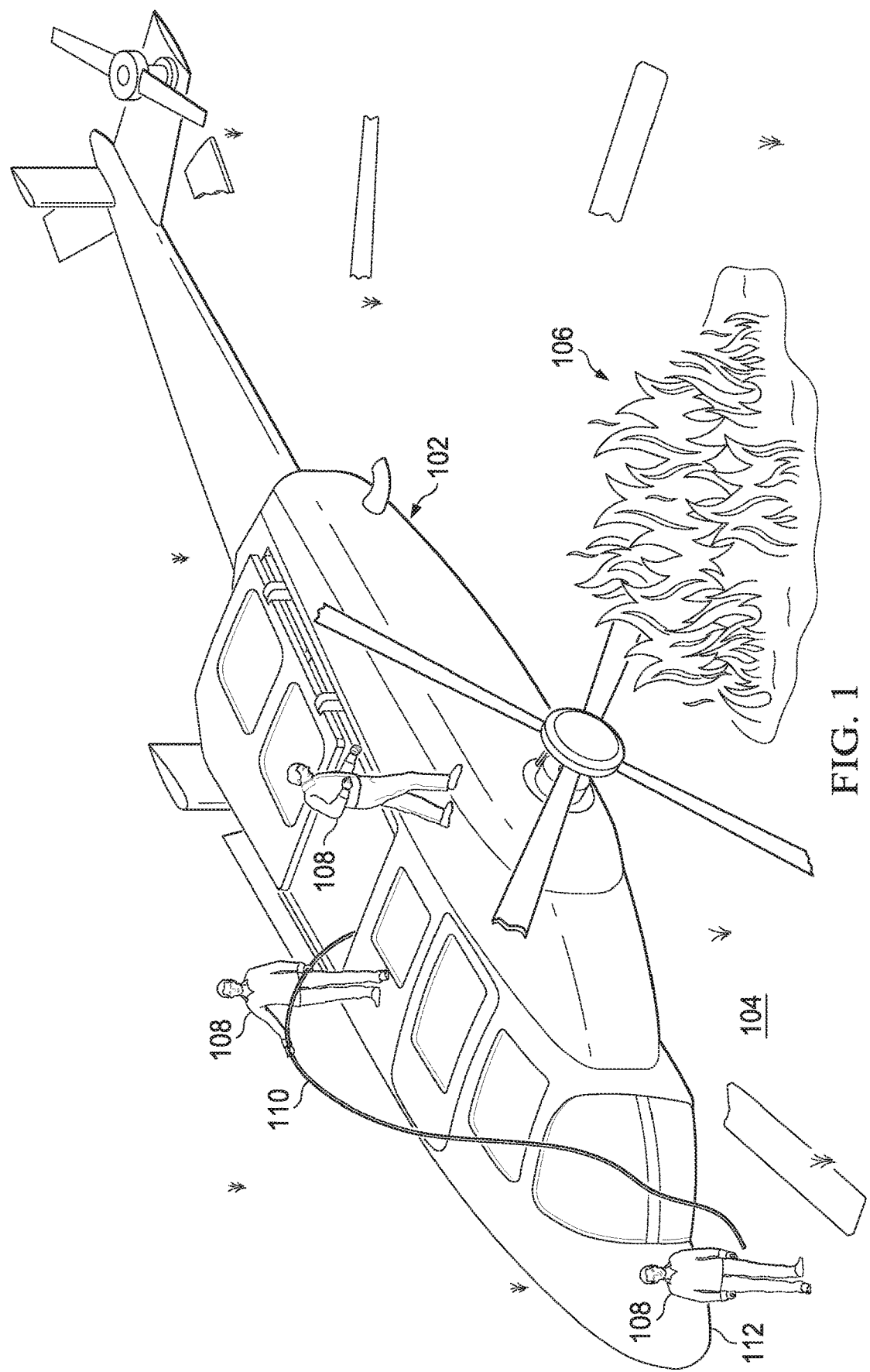
FIG. 1 is a schematic diagram showing emergency egress from an example of a rotorcraft in an emergency condition.

FIG. 1 is a schematic diagram showing emergency egress from an example of a rotorcraft 102 in an emergency condition. In some implementations, the rotorcraft 102 can be a helicopter or any rotorcraft rated to carry 30 or fewer passengers and having an exit threshold more than 6 feet above the ground. In such a rotorcraft, the FAA regulations allow user of rope as an emergency egress aid to be an alternative to a slide. The rotorcraft 102 is shown in a roll-over emergency condition in FIG. 1, but can be in any emergency condition. In this condition of the rotorcraft 102, an occupant 108 can exit the rotorcraft 102 and reach the ground 104 via a roof of the rotorcraft 102. However, if a fire 106 prevented such exit, the occupant 108 can implement the illuminated rope 110 described in this disclosure for a safer evacuation to the ground. For example, the occupant 108 can throw the rope over the belly, or the roof cowling, or the nose 112 of the rotorcraft 102, and descended to the ground 104 using the rope 110.

Figure 2A:
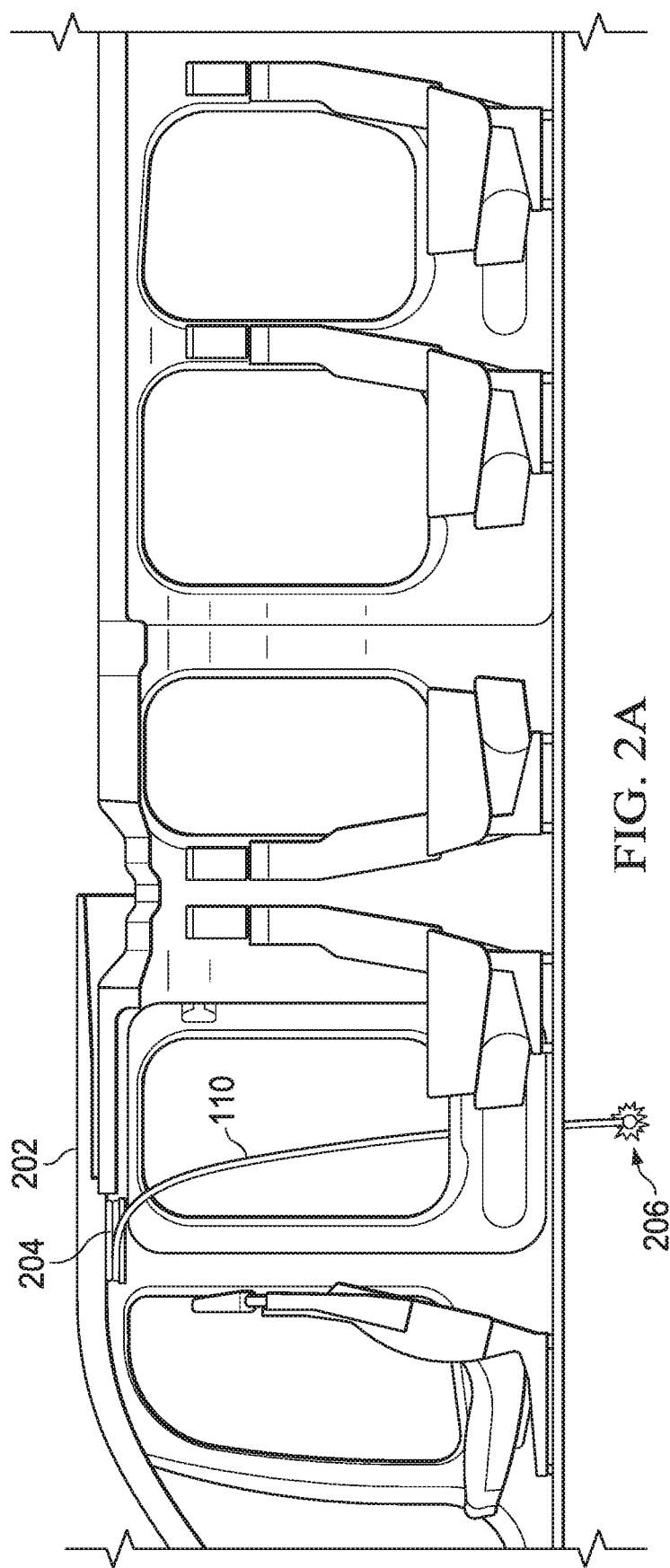
FIG. 2A is a schematic diagram of an emergency egress aid attached to a structural member of an example of a rotorcraft.

FIG. 2A is a schematic diagram of an emergency egress aid attached to a structural member of an example of a rotorcraft, for example, the rotorcraft 102. In some implementations, the emergency egress aid is an illuminated rope like the illuminated rope 110. A first end of the illuminated rope 110 can be attached to do a structural member, for example, the fuselage 202 or other structural member, of the rotorcraft 102. The illuminated rope 110 can be of at least a length such that a second end of the illuminated rope 110 touches the ground 104 on which the rotorcraft 102 is positioned in an emergency. The illuminated rope 110 can have a tensile strength that is sufficient to withstand the weights of occupants of the aircraft without breaking. For example, certain FAA regulations specify that the tensile strength of the illuminated rope 110 be sufficient to carry a load of at least 400 pounds. The structural member of the rotorcraft 102 to which the first end of the illuminated rope 110 is attached can have sufficient rigidity to withstand the tensile force of the illuminated rope 110 without breaking. Also, the location where the illuminated rope 110 is stowed and the structural member to which the first end is attached can be near the exit where its use is intended. Attachments for the illuminated rope 110 can include permanent and removable attachments connections to structural members clearly marked for such use including beams, bulkheads, intercostals, and frames. The attachment means can be simple connector mechanisms such as a carabiner or other oblong metal ring devices having a spring-hinged side to prevent inadvertent detachment once affixed to the structural attachment.

In the emergency in the rotorcraft 102 (example, when the rotorcraft 102 is in a roll-over position), the emergency evacuation path can extend from at least an emergency exit location in the rotorcraft 102 to the ground 104 on which the rotorcraft 102 can be in the roll-over position. The illuminated rope 110 can span at least the length of the emergency evacuation path and some additional length within the rotorcraft 102, clearly marking the emergency evacuation path due to its luminescence. For example, depending on the position of the rotorcraft 102 during the emergency, the emergency evacuation path can span over a cowling or a nose of the rotorcraft 102. In such instances, the length of the rope can span from the position on the structural member (for example, the fuselage 202) to which the first end of the illumination rope 110 is attached through an interior of the rotorcraft 102 and along the emergency evacuation path to the ground 104.

In some implementations, the illuminated rope 110 can include a light source configured to provide illumination in an emergency. For example, the illuminated rope 110 can include multiple ultra-violet light emitting diodes (LEDs) configured along the rope to emit light, the LEDs being charged by a battery or other electrical source at the structural attachment end that is activated during removal of the rope from stowage. Another embodiment of illumination is by photoluminescence in which the rope is exposed to one or more ultra-violet LEDs while in stowage, which once removed from stowage and deployed emits light for an extended period of time in terms of multiple hours. In another example, the illuminated rope 110 can include multiple frangible chemical storage sections, each storing a respective chemical. When mixed as a result of disturbance of the rope during removal from stowage, the chemicals can emit light by chemi-luminescence. In such an example, the illuminated rope 110 can include an impact device that can automatically activate the chemical reaction by breaking the frangible storage sections to initiate the chemical reaction.

In another example, the illuminated rope 110 can include multiple fiber optic cables configured to carry light from a power source connected to the ends of the multiple fiber optic cables. Each fiber optic cable can include between 13 and 20 fiber optic strands. Each strand can be configured to emit terminus illumination with a luminosity at or greater than that specified by the FAA regulations. The fiber optic cable can taper along the length as each individual optical fiber ends in a progressive manner enabling light to emit from the end of each terminated optical fiber to provide illumination along the length of the illuminated rope 110. In some implementations, the individual fibers can be splayed or bevel cut so that the illumination emitting from the end of the rope is at least hemispherical or approaches spherical distribution of light. In such an example, the power source, for example, a battery source powering an LED, can be positioned at or near the first end of the illuminated rope 110 that is attached to the structural member, for example, the fuselage 202, of the rotorcraft 102. The power source can be a light source that can emit light to be carried by the multiple fiber optic cables from the first end to the second end of the illuminated rope 110. The power source can be configured to automatically activate when the rope is removed from stowage.

In some implementations, the illuminated rope 110 can include multiple composite fibers, for example, low extension polyester, within which the light source is embedded. The multiple composite fibers can be interwoven to provide the illuminated rope 110 sufficient tensile strength to carry the occupants of the rotorcraft 102 or to satisfy the FAA regulations or both. In an example, one or more chemi-luminescent cables can be woven into a rope. The woven rope can be expanded using inextensible fibers.

Figure 2B:
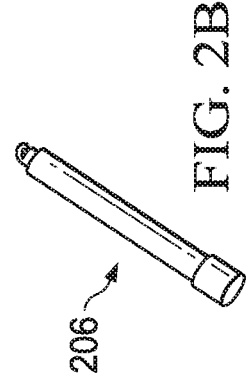
FIG. 2B is a schematic diagram of an end of the emergency egress aid of FIG. 2A.

In some implementations, the illuminated rope 110 can be formed as a hybrid illuminated rope by combining two illuminated ropes of different types. For example, the illuminated rope 110 can include a first section and a second section connected end-to-end. Each section can be one of the examples of the illuminated rope 110 described above. For example, the first section can include multiple fiber optic cables with a power source to provide light and the second section can include multiple frangible sections that can provide light by chemi-luminescence. FIG. 2B shows an example of a multi-section illuminated rope. The first section, for example, multiple fiber optic cables or multiple composite fibers embedding a light source can span substantially the entire length of the emergency evacuation path. For example, the first section can span from the first end attached to the fuselage 202 to the ground 104. The second end, for example, a chemi-luminescent portion (such as a glowstick), can be included in the portion of the illuminated rope 110 that touches the ground. The first section can be longer than the second section. In another example, the fiber optic cables need not emit light along an entire length of the illuminated rope 110. Instead, different and separate lengths of the fiber optic cables can be combined with different and separate lengths of non-light emitting rope (for example, composite fibers) to such that the resulting illuminated rope intermittently emits light, for example, every 18-24 inches. Alternatively, the illuminated rope 110, for example, the rope including multiple fiber optic cables, can be covered with a shielding. Windows can be formed in the shielding at certain lengths along the illuminated rope 110 allowing the light to be visible.

In any implementation, a luminosity of the light provided by the illuminated rope 110 can be at least equal to that specified by FAA regulations, for example, 0.03 ft-candle. In addition, in implementations in which the illumination is produced by photoluminescence or chemi-luminescence or other mechanism in which the luminosity decreases over time, the light sources for the illuminated rope 110 can be selected to provide light at the FAA regulations-specified luminosity for at least the FAA regulations-specified time, for example, at least 10 minutes. Also, the luminosity of the second section, i.e., the section that lies on the ground 104 when the illuminated rope 110 is deployed, can be greater than the luminosity of the first section to facilitate viewing the ground from the emergency exit door. In the example in which the illuminated rope 110 implements fiber optic cables, the power source can be configured to provide sufficient power to provide light at the FAA regulations-specified luminosity for at least the FAA regulations-specified time, for example, at least 10 minutes. Also, in any implementation, one or more structural anchors (for example, hooks or other structural anchors) can be positioned at different positions along the emergency evacuation path. The illuminated rope 110 can be connected to the structural anchors before or after the emergency.

Figure 3:
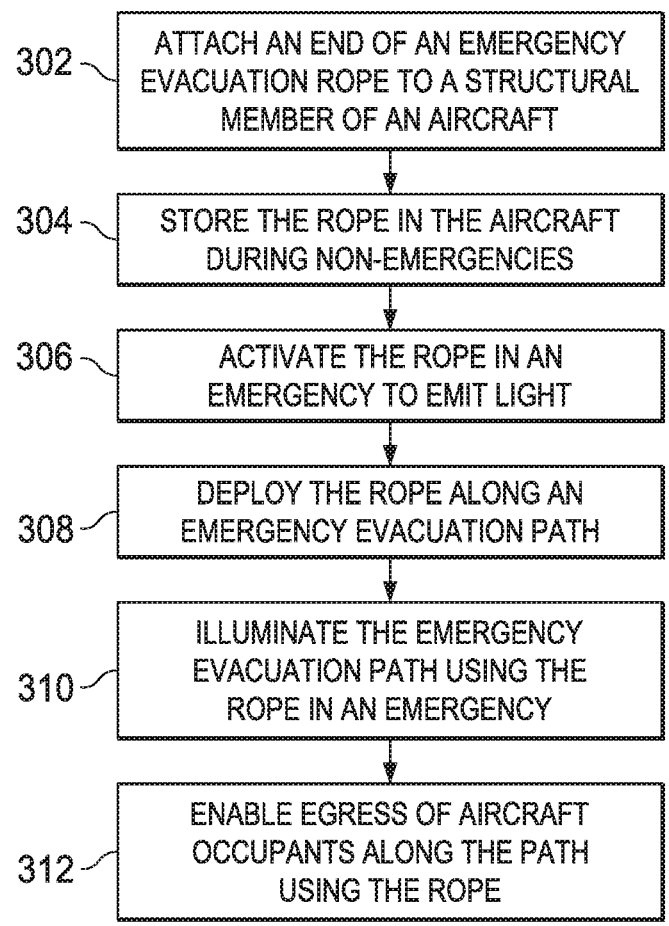
FIG. 3 is a flowchart of an example of an aircraft emergency evacuation process.

FIG. 3 is a flowchart of an example of an aircraft emergency evacuation process 300. At 302, an end of an emergency evacuation rope (for example, the illuminated rope 110) can be attached to a structural member (for example, a fuselage) of an aircraft (for example, the rotorcraft 102). At 302, the rope can be stored in the aircraft during non-emergencies. In an emergency in the aircraft, at 306, the rope can be activated to emit light. The rope can emit light in response to the activation. At 308, the rope can be deployed along an emergency evacuation path. At least a portion of the emergency evacuation path can extend to a location outside the aircraft. At 310, the emergency evacuation path can be illuminated using the light emitted from the emergency evacuation rope. At 312, egress of aircraft occupants along the path can be enabled using the rope. For example, the aircraft occupants can lower themselves to the ground along the emergency evacuation path using the rope. In instances in which the emergency evacuation path spans over the cowling or the nose of the rotorcraft 102, the aircraft occupants can be lowered to the ground from the emergency exit location over the cowling or the nose of the rotorcraft 102.

Thus, particular implementations of the subject matter have been described. Other implementations are within the scope of the following claims.

The invention claimed is:

1. A vehicle emergency evacuation method comprising:
attaching a first end of an emergency evacuation rope to a structural member of a vehicle, wherein the emergency evacuation rope is configured to have a length such that a second end of the emergency evacuation rope touches a surface on which the vehicle is positioned in an emergency, and emit light in response to an activation of the emergency evacuation;
in the emergency in the vehicle:
illuminating an emergency evacuation path using the light emitted from the emergency evacuation rope, wherein at least a portion of the emergency evacuation path extends to a location outside the vehicle; and
enabling egress of occupants along the emergency evacuation path using the emergency evacuation rope.

2. The method of claim 1, wherein the vehicle is an aircraft.

3. The method of claim 2, wherein the structural member comprises a fuselage of the aircraft.

4. The method of claim 1, wherein an intensity of the light emitted from the emergency evacuation rope is at least 0.03 ft-candle and wherein a tensile strength of the rope is rated to carry a load of at least 400 lbs.

5. The method of claim 3, wherein the aircraft comprises a helicopter, wherein in the emergency in the aircraft, the helicopter is in a roll-over position, and wherein the emergency evacuation path extends from at least an emergency exit location in the helicopter that is to a ground on which the helicopter is in the roll-over position.

6. The method of claim 5, wherein the emergency evacuation path spans over a cowling or a nose of the helicopter between the emergency exit location and the ground.

7. The method of claim 6, wherein enabling egress of the aircraft occupants along the emergency evacuation path using the emergency evacuation rope comprises enabling the aircraft occupants to be lowered to the ground from the emergency exit location over the cowling or the nose of the helicopter.

8. The method of claim 1, wherein the emergency evacuation rope comprises a light source comprising at least one of light emitting diodes (LEDs) configured to emit light by photoluminescence or a plurality of frangible chemical storage sections storing respective chemicals which, when mixed, emit light by chemiluminescence or a plurality of fiber optic cables configured to carry light from a power source connected to ends of the plurality of fiber optic cables.

9. The method of claim 8, wherein the emergency evacuation rope comprises a plurality of composite fibers within which the light source is embedded.

10. The method of claim 8, wherein the emergency evacuation rope comprises a first section and a second section connected end-to-end, the first section comprising the plurality of fiber optic cables and the second section comprising the plurality of frangible chemical storage sections.

11. The method of claim 10, wherein the second section of the emergency evacuation rope touches a surface on which the aircraft is positioned in the emergency.

12. The method of claim 10, wherein the first section is longer than the second section.

13. An aircraft emergency evacuation method comprising:
attaching a first end of an emergency evacuation rope to a fuselage of an aircraft, wherein the emergency evacuation rope is configured to have a length such that a second end of the emergency evacuation rope touches a surface on which the aircraft is positioned in an emergency, emit light in response to an activation of the emergency evacuation rope, and withstand a weight of an occupant comprising at least 400 lbs without breaking;
storing the emergency evacuation rope in the aircraft during non-emergencies in the aircraft;
in the emergency in the aircraft:
activating the emergency evacuation rope, wherein the emergency evacuation rope emits light in response to the activation;
deploying the emergency evacuation rope along an emergency evacuation path, wherein at least a portion of the emergency evacuation path extends to a location outside the aircraft and the second end of the emergency evacuation rope touches the surface, wherein the emergency evacuation rope illuminates the emergency evacuation path using the light emitted from the emergency evacuation rope; and
enabling egress of aircraft occupants along the emergency evacuation path using the emergency evacuation rope.

14. The method of claim 13, wherein an intensity of the light emitted from the emergency evacuation rope is at least 0.03 ft-candle.

15. The method of claim 13, wherein the aircraft comprises a helicopter, wherein in the emergency in the aircraft, the helicopter is in a roll-over position, and wherein the emergency evacuation path extends from at least an emergency exit location in the helicopter that is over a cowling or a nose of the helicopter to a ground on which the helicopter is in the roll-over position.

16. The method of claim 13, wherein enabling egress of the aircraft occupants along the emergency evacuation path using the emergency evacuation rope comprises enabling the aircraft occupants to be lowered to the ground from the emergency exit location over the cowling or a nose of the aircraft.

17. The method of claim 13, wherein the emergency evacuation rope comprises a light source comprising at least one of light emitting diodes (LEDs) configured to emit light by photoluminescence or a plurality of frangible chemical storage sections storing respective chemicals which, when mixed, emit light by chemiluminescence or a plurality of fiber optic cables configured to carry light from a power source connected to ends of the plurality of fiber optic cables, and wherein the emergency evacuation rope comprises a plurality of composite fibers within which the light source is embedded.

18. The method of claim 17, wherein the emergency evacuation rope comprises a first section and a second section connected end-to-end, the first section comprising the plurality of fiber optic cables and the second section comprising the plurality of frangible chemical storage sections, wherein the second section of the emergency evacuation rope touches a surface on which the aircraft is positioned in the emergency.

19. An aircraft emergency evacuation method comprising:
attaching a first end of an emergency evacuation rope to a structural member of a helicopter, wherein the emergency evacuation rope is configured to have a length such that a second end of the emergency evacuation rope touches a surface on which the helicopter is positioned in an emergency, emit light in response to an activation of the emergency evacuation rope, wherein the emergency evacuation rope comprises a light source comprising at least one of ultra-violet light emitting diodes (LEDs) configured to emit light by photoluminescence or a plurality of frangible chemical storage sections storing respective chemicals which, when mixed, emit light by chemiluminescence or a plurality of fiber optic cables configured to carry light from a power source connected to ends of the plurality of fiber optic cables, and wherein the emergency evacuation rope comprises a plurality of composite fibers within which the light source is embedded;

in the emergency in which the helicopter is in a roll-over position:
- illuminating an emergency evacuation path using the light emitted from the emergency evacuation rope, wherein at least a portion of the emergency evacuation path extends to a location outside the helicopter and touches the surface on which the helicopter is in the roll-over position; and
- supporting, using the emergency evacuation rope, weights of aircraft occupants to egress from the helicopter along the emergency evacuation path.

20. An emergency evacuation rope for a vehicle comprising:
- a first end configured to be attached to a structural member of a vehicle;
- a length such that a second end of the emergency evacuation rope touches a surface on which the vehicle is positioned in an emergency;
- a light source comprising at least one of ultra-violet light emitting diodes (LEDs) configured to emit light by photoluminescence or a plurality of frangible chemical storage sections storing respective chemicals which, when mixed, emit light by chemiluminescence or a plurality of fiber optic cables configured to carry light from a power source connected to ends of the plurality of fiber optic cables;
- a plurality of composite fibers within which the light source is embedded; and
- the emergency evacuation rope is configured to be deployed along an emergency evacuation path that extends to the surface outside the vehicle and withstand a weight of an occupant of the vehicle comprising at least 400 lbs without breaking.

* * * * *